3,122,477
HOG CHOLERA VACCINE AND METHOD OF MAKING THE SAME

William H. Beckenhauer and Albert L. Brown, Lincoln, Nebr., assignors to Norden Laboratories, Inc., Lincoln, Nebr., a corporation of Delaware
No Drawing. Filed Nov. 4, 1960, Ser. No. 67,179
2 Claims. (Cl. 167—80)

This invention relates to preparation of a vaccine from bovine virus diarrhea virus for immunization of swine against hog cholera.

Hog cholera, also known as swine fever (English), Schweinepest (German), peste du porc (French) and peste suina (Italian), is an acute, highly contagious disease of swine caused by a filterable virus. The disease is characterized by generalized hemorrhages, necrosis and infarctions in the internal organs. The infection usually runs an acute course with 90 to 100% mortality. Occasionally it may become chronic. It has been estimated that the annual loss from hog cholera amounts to from 30 to 40 million dollars.

The first records indicate that hog cholera appeared in Ohio in 1833. From there it was spread to all parts of the United States by shipment of stock. However, it was not until 1885 that hog cholera was first recognized as a distinct disease entity by Salmon and Smith. They believed the disease to be caused by a bacterial organism now known as *Salmonella choleraesuis*. In 1903 De Schweinitz and Dorset proved that the disease was caused by a virus and that the "hog cholera bacillus" played only a secondary and non-essential role.

The first method of protecting swine against this disease was by use of hog cholera antiserum. Although effective, this treatment provided only short term protection. In order to produce a permanent protection, the next method used was simultaneous serum and virulent virus vaccination. If the pigs are in good health when treated, kept under good conditions and well fed, this method is usually very successful. However, if the pigs are sick, parasitized, or unthrifty for other reasons, or if they have been recently shipped or subjected to a surgical procedure, it is unsafe to use the simultaneous method since many of the pigs will die, develop hog cholera or secondary infections and die in spite of the antiserum. This method also has another drawback since two products have to be administered to produce the desired protection. If the antiserum is lacking in potency, the pigs will not be protected and will die of hog cholera. This is known as a "serum break." On the other hand, if the virus is weak, the pigs receive only passive immunity and may later die of hog chlorea if exposed. This is known as a "virus break." By means of such breaks and use of the virulent virus, hog cholera has been perpetuated. Realizing this, and as a result of recommendations by experts on this disease, thirty-two States have now outlawed the use of virulent virus for vaccination. In a few years this method will be only of historical interest.

Because of the dangers of perpetuating hog chlorea by vaccination and because of the occurrence of "virus breaks" and "serum breaks" and also the failure of animals in poor health to immunize properly, killed virus vaccines were developed. Two such vaccines have been used extensively. In crystal violet vaccine, the virus is killed by crystal violet. In Boynton vaccine the virus is killed by eucalyptol. These vaccines provided immunity, but not as well as the simultaneous method. For example, in one study it was shown that the Boynton vaccine provided only about 75% protection after ninety days. Furthermore, these vaccines cannot be used when hog cholera already exists on the premises until all animals have been protected by a dose of antiserum. Another drawback to these vaccines is that they do not provide full immunity for about three weeks. Generally speaking, these vaccines are no longer popular.

To overcome the problems of making a safe vaccine with the advantages of rapid immunity and solid protection obtained with the simultaneous method, several attenuated live virus vaccines have been developed. These vaccines were developed from strains of hog cholera virus that had been modified by passage in rabbits or tissue culture to the point where they mostly eliminated the pathogenic properties. One type of vaccine is prepared from virus grown in rabbits by harvesting tissues when virus growth is at a maximum. The other type of vaccine is prepared from virus modified by rabbit passage but then grown for vaccine production in swine by harvesting tissues when virus growth is at a maximum. The first type of vaccine is generally, but not always, used with antiserum. With the second type of vaccine it is customary to use a simultaneous dose of antiserum, since the virus has not been modified to the point where no reaction may be expected.

While all of the vaccines discussed to this point have been shown to have their uses, all of them depend upon harvesting tissues from animals. These methods of vaccine production are expensive because a large number of animals must be used, since only a small portion of their tissues is actually harvested—the blood and the spleen. These methods of vaccine production are also uncertain because it is not possible to know for certain from the number of animals inoculated the number which will show a typical response permitting harvesting of the tissues.

These methods in the case of the live virus vaccine produced in swine or porcine tisssue culture also increase the risk of contamination by agents responsible for virus pig pneumonia and atrophic rhinitis, among others. This matter is sufficiently serious for one expert, Dr. George A. Young, to recommend the use of vaccine produced in rabbits exclusively for immunization of animals raised under his specific pathogen free pig program.

These vaccines have proven difficult to standardize since the measurement of the actual virus content would involve the immunization of swine using dilutions of virus. Following challenge with virulent virus, those pigs which which were immunized with too small a dose of vaccine— in other words, no virus—would sicken and die. Since this method of standardization is, generally speaking, completely impractical and the potency of vaccines from serial to serial may vary greatly, another disadvantage of producing virus for vaccine production in animals is that it is not under well controlled conditions. Depending on the health, general condition, and nutrition of the animal inoculated, the results may vary widely.

At the present time, a hog cholera vaccine of tissue culture origin is available commercially. However, this vaccine is produced on cultures of swine cells using a modified strain of hog cholera virus that is not cytopathogenic. This vaccine, although it takes advantage of lower costs and better control, still has most of the disadvantages of vaccines produced in live animals. There is the possibility of contamination with other agents. It is also not possible to measure this virus accurately without resorting to the method previously described.

The production of viruses in tissue culture is desirable because the production method is cheaper and the method is under better control, but up to the present time, despite numerous attempts, there are no strains of hog cholera virus in tissue culture which are modified to the extent that they cannot produce disease when inoculated into healthy pigs without the use of hog cholera antiserum.

It is, therefore, a principal object of the present invention to produce a hog cholera vaccine that incorporates all three of the most desirable features of a live virus vaccine, namely (1) a live virus vaccine made from a virus of modified or reduced virulence for swine; (2) a live virus vaccine propagated in tissue culture; and (3) a live virus vaccine propagated on cells from a species of animals other than swine.

Following reports that there was some serological relationship between bovine mucosal disease virus and hog cholera virus and also between bovine mucosal disease virus and bovine virus diarrhea virus, we decided to try protecting pigs against hog cholera by inoculation with strains of bovine virus diarrhea virus and bovine mucosal disease virus. Since virus diarrhea and mucosal diseases do not have any resemblance to hog cholera either the clinical disease or the pathology, it would not be expected that these viruses would be related. There was no way to predict that a strain of bovine virus diarrhea virus would make a suitable immunizing agent for protecting swine against hog cholera. It is well known that even a close serological relationship does not necessarily mean the development of protective antibody. However, in accordance with the present invention, we have discovered that vaccination of swine with a tissue culture propagated virus of bovine virus diarrhea will immunize swine against hog cholera, and without producing symptoms or lesions of hog cholera.

Therefore, other objects of the invention are to prepare a vaccine for hog cholera from tissue culture propagated virus of bovine virus diarrhea; to provide for propagation of bovine virus diarrhea in a tissue culture system containing other than porcine cells, namely, bovine cells; and to provide for propagation of the virus on bovine cells that are free from contamination with other viruses.

In carrying out the invention, the virus used is a strain of bovine virus originally isolated from a naturally occurring disease condition in cattle. Such live virus is not a hog cholera virus, so there is no danger of it reverting to virulence for swine. We have found that the most effective strain of bovine virus diarrhea virus is known by the name of Oregon virus diarrhea virus.

We have also found that virus of this character can be propagated on embryonic bovine kidney cells in tissue culture. This particular tissue culture has advantages in itself. Embryonic bovine kidney cells, in contrast to adult tissue of almost all species, is remarkably free from contamination with other viruses. Even if they should happen to contain other viruses, they would not be liable to cause infection in swine—a foreign host. The cells grow rapidly in relatively simple culture media. Embryonic bovine kidneys are easily obtained, and, since embryos have no value, would be discarded anyway. The virus causes a complete cytopathic effect on the cells, making it possible to determine exactly when virus growth is optimum for making vaccine and also making it possible to measure, in a practical manner by titration, the virus content of the vaccine at all states of production and again in the finished product.

A preferred method of producing the vaccine in accordance with the present invention is as follows:

Bovine embryos are obtained and the kidneys removed under aseptic conditions. The cortex of the kidneys is then removed and minced up. Using well known tissue culture techniques, the minced kidney tissue is treated with trypsin to separate the tissue into individual cells and small clumps of cells. After processing, these cells are inserted into a nutrient fluid medium using approximately 0.25 ml. of packed cells to each 100 ml. of nutrient fluid (often referred to as a 1:400 dilution) and inoculated into flat glass bottles (roux bottles) which are then rubber stoppered. The nutrient fluid consists of Hanks salt solution containing 10% bovine serum, 10% of a 5% solution of lactalbumin hydrolysate, penicillin and dihydrostreptomycin, and is brought to a pH of 7.2–7.6 with a sodium bicarbonate solution. Many other nutrient fluids are equally useful for this purpose; this one has proven most satisfactory for our use, but is not essential to the process of vaccine production. The bottles are then placed in an incubator at a temperature between 35° C. and 37° C. with their flat side down. The cells settle to the flat surface of the bottle and begin to grow in sheets which stick to the glass. In four or five days the cell sheets cover the bottom of the bottle and are ready to be inoculated with virus.

Before the cells are inoculated with Oregon virus diarrhea virus, the fluid medium is removed and a fresh medium is put on the cells. This medium in turn is immediately removed, fresh medium is again added and removed, and finally fresh medium in an amount of 100 ml. is added to the bottle to serve as nutrient for the cell sheet. This is a washing process to remove by dilution as much of the original bovine serum as possible. The medium used consists of Earle's salt solution with 10% of a 5% solution of lactalbumin hydrolysate and penicillin and dihydrostreptomycin, but no serum.

The content of the bottles is then inoculated with the bovine virus diarrhea virus of the Oregon type, using a 1% inoculum (1 ml. of tissue culture fluid containing virus) and the bottles are returned to the incubator. In about five to seven days' time the virus is ready to be harvested. The fluid as harvested is suitable for immunizing swine. It may also be diluted and it may also be lyophilized to provide the final product.

When portions of the virus-laden tissue culture fluid were inoculated into swine, the swine developed no signs of illness. When vaccine-inoculated swine, along with other non-inoculated swine, were challenged two weeks later by inoculation with virulent hog cholera virus, all inoculated swine survived the challenge, indicating that immunity to hog cholera had been established. All non-inoculated swine developed increasingly grave symptoms characteristic of hog cholera and succumbed. These non-inoculated swine demonstrate that the swine were originally susceptible to hog cholera and that the hog cholera virus used for challenge was virulent and lethal.

In order to determine if any strain of bovine virus diarrhea virus would be suitable for the immunization of swine against hog cholera, vaccines were also prepared in accordance with the above described method using each of the following strains of bovine virus diarrhea virus, namely, Nebraska mucosal disease and Nebraska virus diarrhea. While these strains are closely related to the Oregon type, they are not identical. Four pigs of about the same size from among a group believed to be unvaccinated and unexposed to hog cholera were selected for test of the vaccines. Three of these pigs were each inoculated with a single subcutaneous-intramuscular dose of one of the vaccines. The fourth pig was left as a normal control. Fourteen days following vaccination, each of the animals was challenged with virulent hog cholera virus. The results of this experiment are shown in Table I:

Table I

| Strain: | Reaction to challenge |
|---|---|
| Nebraska virus diarrhea | Dead 7 days—hog cholera. |
| Nebraska mucosal disease | Dead 7 days—hog cholera. |
| Oregon virus diarrhea | No reaction. |
| Control | Dead 7 days—hog cholera. |

To determine if these results could be repeated with vaccine using the Oregon virus diarrhea strain of bovine virus diarrhea, a group of sixteen pigs was selected from two groups believed to be unvaccinated and unexposed to hog cholera. Ten of these were each inoculated with a single subcutaneous-intramuscular dose of vaccine.

Three animals were left in contact with these animals as contact controls and three others were placed in another pen. Fourteen days following vaccination each of these pigs was challenged with virulent hog cholera virus. The results of this experiment are shown in Table II:

*Table II*

| Treatment: | Reaction to challenge |
|---|---|
| Vaccinated | Remained healthy and survived. |
| Contact controls | Died of hog cholera. |
| Isolated controls | Died of hog cholera. |

Since this test corresponds to tests used for safety-potency testing of hog cholera vaccine, it serves as conclusive evidence that the Oregon virus diarrhea strain of bovine virus diarrhea virus serves a useful purpose for the immunization of swine against hog cholera.

It is obvious that we have provided a method of preparing a vaccine against hog cholera, which, briefly stated, comprises inoculating fluids containing bovine tissue culture cells with the Oregon strain of bovine virus diarrhea virus, incubating said tissue culture at a temperature of about 35° C. until the virus has increased by at least 100 times, then harvesting the tissue culture fluid containing the virus and using these fluids to immunize swine against hog cholera. The vaccine should contain at least one thousand to one hundred million TCID/ml.

The vaccine produced in accordance with the present invention is an improvement on all previous hog cholera vaccines, because it immunizes susceptible swine against hog cholera using a virus of bovine origin and propagated in a culture media free of any contaminants of swine origin. Therefore, the virus when inoculated into swine causes no reaction other than the development of antibodies protecting against hog cholera.

What we claim and desire to secure by Letters Patent is:

1. A method of stimulating production of immunity to hog cholera in swine comprising injecting into susceptible swine a vaccine product prepared by the process which comprises incubating at approximately 35° C. to 37° C. embryonic bovine kidney cells in a bovine-serum containing nutrient fluid medium, having a pH of approximately 7.2 to 7.6 for a sufficient period of time for the cells to settle out and grow in a sheet, removing the fluid medium from the sheet of cells, washing the sheet of cells with a serum-free nutrient culture medium to remove by dilution as much of the original bovine serum as possible, inoculating the sheet of cells with an inoculum of Oregon strain bovine virus diarrhea virus, incubating the inoculated sheet of cells to increase the Oregon strain virus diarrhea virus at least 100 times and harvesting the fluid vaccine product containing at least one thousand to one hundred million TCID/ml.

2. The method of claim 1 wherein the vaccine product is lyophilized.

References Cited in the file of this patent

Gillespie et al.: The Cornell Veterinarian, January 1960, pages 73–74.

Wenner: Advances in Virus Research, vol. V, 1958, pages 39–49, 61–62; pages 48, 49, 61, and 62 are especially pertinent.

Lee et al.: Biol. Abst., 1958, page 186, paragraph 2051.

Carlson dissertation, Abstracts, vol. 16, page 1980, November 1956.

Darbyshire Vet. Rec. 72, 331, 1960.

Beckenhauer et al.: Vet. Med., March 1961, pages 108–112.

Warren: Am. J. Vet. Res., January 1960, vol. 21, No. 8, pages 111–119.

Adams: Virology, 1959, 351–353.

Lee et al.: Amer. J. Vet. Res., October 1957, vol. 18, pages 952–953.

Gillespie et al.: The Cornell Veterinarian, pages 75–79, 1960.